Sept. 13, 1938.   J. D. WILHOIT   2,129,753
ICE CREAM DISHER
Filed June 14, 1937
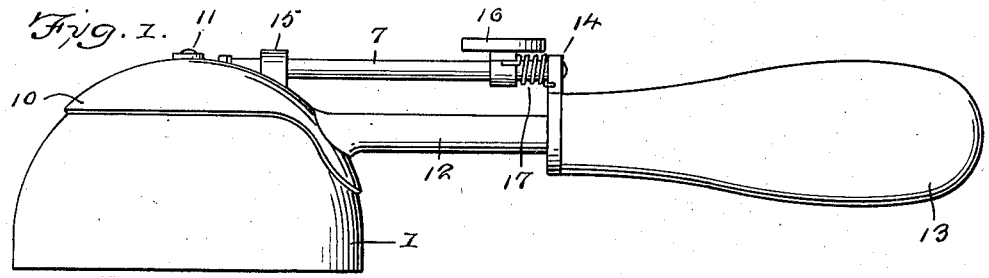
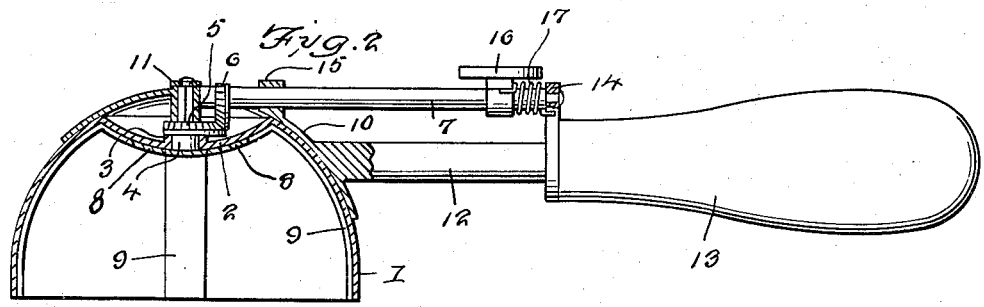
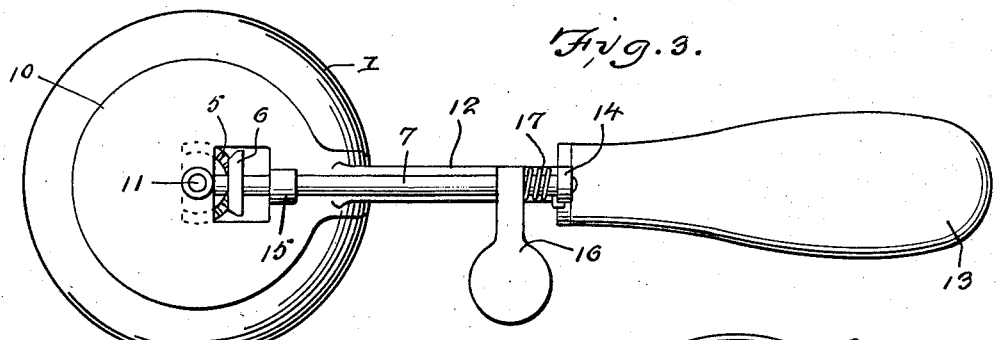
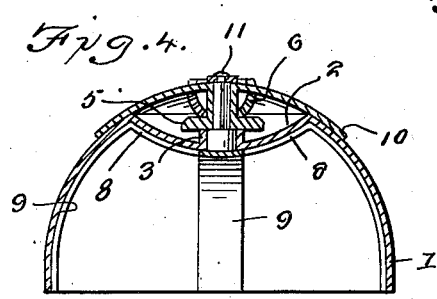
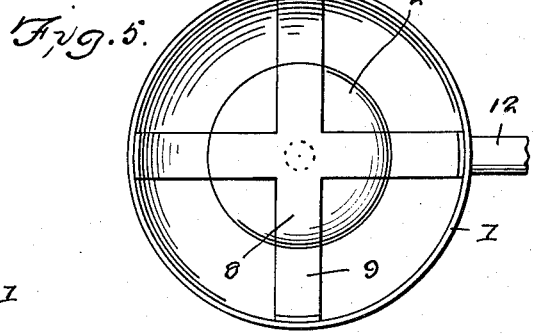
Joseph D. Wilhoit, INVENTOR
BY Victor J. Evans & Co.
ATTORNEYS Patented Sept. 13, 1938

2,129,753

UNITED STATES PATENT OFFICE 2,129,753

ICE CREAM DISHER

Joseph D. Wilhoit, Louisville, Ky.

Application June 14, 1937, Serial No. 148,195

1 Claim. (Cl. 107—48)

This invention relates to dippers especially adapted for dispensing ice cream and the like in molded form and has for the primary object the provision of means for ejecting the molded ice cream from the dipper and simultaneously form an indentation therein of sufficient size to receive and hold a flavoring syrup after placing the ice cream on a dish or receptacle.

With these and other objects in view, this invention consists in certain novel features of construction, combination and arrangement of parts to be hereinafter more fully described and claimed.

Further claims as to the first paragraph above are that the indentation formed on an ejected portion of ice cream that has been placed on or in an ice cream cone will enable a double or triple dip portion be served at one time in the same cone more efficiently since the indentation formed in each ejected portion will be a substantial receptacle for each succeeding dipped portion.

For a complete understanding of my invention, reference is to be had to the following description and accompanying drawing, in which Figure 1 is a side elevation illustrating an ice cream disher constructed in accordance with my invention.

Figure 2 is a vertical sectional view illustrating the same.

Figure 3 is a top plan view illustrating the device.

Figure 4 is a transverse sectional view illustrating the scoop or cup-shaped element of the disher and the means associated therewith for ejecting ice cream therefrom.

Figure 5 is a plan view illustrating the same.

Referring in detail to the drawing, the numeral 1 indicates a substantially semi-spherical shaped scoop in which a wall thereof is indented to form a conical shaped bottom 2 to the scoop for the purpose of forming into ice cream molded by the scoop an indentation for the purpose of receiving a flavoring syrup or extract after the ice cream has been deposited on a dish or other receptacle.

The bottom 2 is provided with a centrally arranged opening surrounded by a bearing collar 3 rotatably supporting a shaft 4 on which is mounted a segmental shaped gear 5 meshing with a correspondingly shaped gear 6 secured to an operating shaft 7. The shaft 4 has secured thereto arms 8 located within the scoop 1. Each arm has a portion bent to conform to the curvature of the bottom 2, while another portion of said arm is bent to conform to the contour of the walls of the scoop and provide a knife 9 for scraping from or loosening the ice cream from the walls of the scoop so that the ice cream caught within the scoop may be readily ejected therefrom.

A hood 10 fits over a portion of the scoop 1 and overlies the indentation forming the bottom 2 and is apertured to receive the shaft 4. The shaft after extending through the hood is equipped with a removable fastener 11. A shank 12 is formed on the hood and carries a handle 13 provided with an extension 14 to which is journaled one end of the shaft 7, the hood 10 carrying a bearing 15 for rotatably supporting the shaft adjacent its opposite end. A finger or thumb piece 16 is secured to the shaft 7 and extends laterally therefrom and in close proximity to the handle 13 whereby the operator gripping the handle may utilize a finger or thumb for imparting movement to the shaft 7 which in turn operates the knives 9. A coil spring 17 is mounted on the shaft 7 with one end in engagement with the finger piece 16 and its opposite end in engagement with the extension 14 for the purpose of returning the shaft 7 to a normal position when rotated in one direction by a pressure exerted on the finger piece. After the placing of ice cream within the scoop in the usual manner, a pressure is placed on the finger piece 16, actuating the knives 9, separating the molded ice cream from the scoop and allowing the ice cream to pass therefrom onto a dish with a recess formed in the ice cream to receive a flavoring.

While I have shown and described the preferred embodiment of my invention, it will be understood that minor changes in construction, combination and arrangement of parts may be made without departing from the spirit and scope of my invention, as claimed.

Having described the invention, I claim:

An ice cream dipper comprising a scoop having one wall curved inwardly to form an indentation in ice cream molded within the scoop and provided with a bearing opening located centrally thereof, a shaft journaled in the opening, means carried by the shaft for loosening the molded ice cream from the walls of the scoop, a hood conforming to the contour of the scoop and secured thereto and overlying the inwardly curved portion of the scoop and provided with a bearing opening to rotatably receive the shaft, a shank carried by the hood, a handle on said shank, a second shaft rotatably supported by the handle and the hood, gearing connecting the first and second named shafts and located in the space between the hood and the indentation of the body, a finger piece on the second shaft for the manual rotation of the shaft in one direction, and a spring acting on said shaft for the rotation thereof in an opposite direction.

JOSEPH D. WILHOIT.